J. SCHMID-ROOST.
BALL GUIDE FOR BALL BEARINGS.
APPLICATION FILED NOV. 12, 1912.
1,205,797.
Patented Nov. 21, 1916.
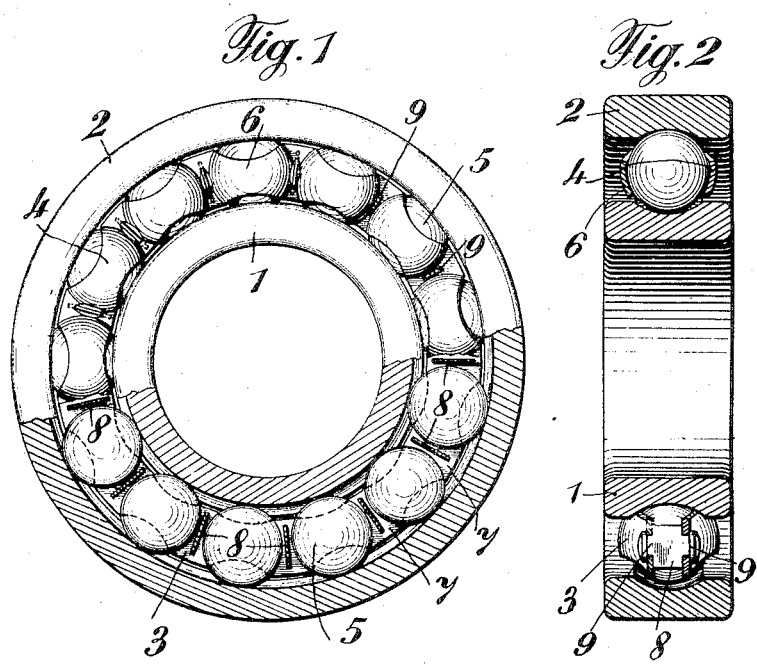
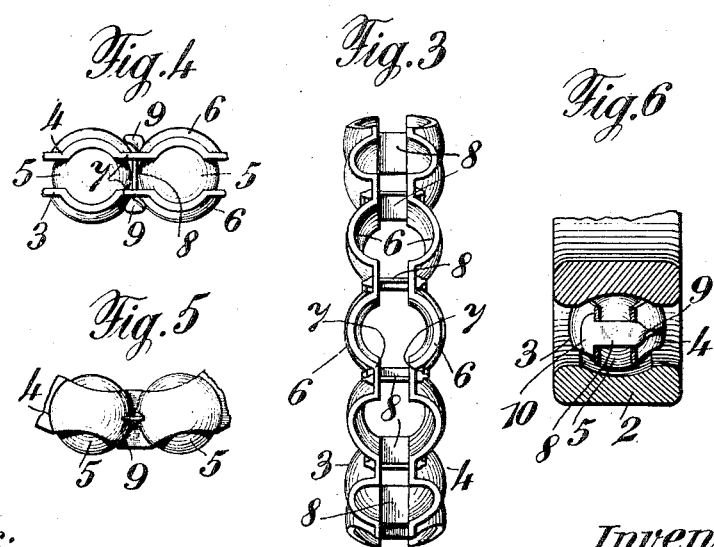
Witnesses:
P. Mommers
E. Leckert.
Inventor:
Jakob Schmid-Roost,
By _____ Atty.

UNITED STATES PATENT OFFICE.

JAKOB SCHMID-ROOST, OF OERLIKON, SWITZERLAND.

BALL-GUIDE FOR BALL-BEARINGS.

1,205,797.  Specification of Letters Patent.  Patented Nov. 21, 1916.

Application filed November 12, 1912. Serial No. 730,971.

*To all whom it may concern:*

Be it known that I, JAKOB SCHMID-ROOST, a citizen of the Republic of Switzerland, residing at Oerlikon, Switzerland, have invented new and useful Improvements in Ball-Guides for Ball-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a ball guide for ball bearings which is provided with two pressed rings laterally covering the balls and forming pockets for them. While in the hitherto proposed ball guides of this type both the pressed rings between the single pockets are immediately connected to each other, according to this invention the rings are connected to each other by intermediate members separating the balls from each other. This connection can be obtained in a varied manner.

The new construction possesses various advantages. Firstly the guide is not closed, but the pockets only laterally surround the balls, and between the balls they do not extend so far that both rings touch each other. By this means the friction surface of the balls which are not any more wholly inclosed becomes smaller and on the other hand the material is not strained so much as before by pressing the rings, because the pockets need not to be pressed so deep as before, whereby waste-rings are saved. Furthermore the balls may be arranged at a smaller distance from each other.

Since the intermediate separating members can be made very thin, there is obtained much space for the lubricant and if oil-lubrication is used the separating parts act as a scoop-wheel.

In the accompanying drawing several constructions according to this invention are illustrated by way of example.

Figure 1 is a side elevation partly in section of a first construction of a ball bearing provided with a ball guide. Fig. 2 is a vertical section through the same. Fig. 3 shows the ball guide, the balls being omitted. Fig. 4 is a side elevation showing a part of a second construction of the ball guide. Fig. 5 is a plan view of the same. Fig. 6 is a sectional view showing a part of a third construction.

In the first form of construction 1 designates the inner ball bearing ring and 2 the outer ball bearing ring of the ball bearing.

3 designates the one ring and 4 the other ring of the guide for the balls 5. The bent parts 6 of both rings 3 and 4 form the mentioned pockets for the balls. These parts 6 are connected to each other by parallel parts 7. The parts 7 of both rings 3 and 4 do not touch each other, but are spaced from each other. Between the parts 7 there are provided intermediate parts 8, which are riveted to both rings. By this means the rings are connected to each other and the balls separated from each other.

In the form of construction according to Figs. 4 and 5 the nose portions 9 which laterally project from the rings 3 and 4 are laterally bent about 90° so that they laterally hold fixedly against the curved surfaces of the parts 6. The intermediate parts 8 may be bent in this manner either only at one end or on both ends.

In the form of construction according to Fig. 6 the projection 9 is made of the same width as the intermediate part 8 and at one end of the latter there is provided a finished head 10, so that only the other end is bent. Also in the construction according to Figs. 4 and 5 the intermediate part 8 may be made of the same width as the projections 9.

The distance between the rings 3 and 4 may be adjusted to provide for wear of the balls and ring by increasing the degree of twist to the nose portions 9. When the bearings are first assembled the proper distance between the rings may be had by twisting said nose portions less than 90 degrees, the sides of each nose engaging the spherical portions of the rings near the base thereof. By increasing the degree of twist the spherical portions of the rings will operate as cams to draw the two rings toward each other to obtain a proper rolling fit.

I claim:

1. In a ball bearing, a plurality of balls, all having the same diameter, two rings mounted laterally of the balls and formed with spherical pockets for the reception of the latter, said rings having flat parallel parts between the pockets, thin unperforated connecting members projecting transversely through the parallel parts whose width is the same as the thickness of the connecting members, each connecting member having a single nose on each end of the same thickness as the body part of said member, one nose of each member being axially twisted to engage the outer surfaces of the adjacent pockets, the distance between the rings being adjusted by increasing the degree of twist to the nose of the connecting member.

2. In a ball bearing, balls all of the same diameter, two rings having spherical pockets for the reception of the balls, said rings having flat parallel parts between the pockets, thin connecting members between the balls and projecting transversely through said parallel parts whose width is substantially the same as the thickness of said members, the end of each member projecting through and beyond a parallel part being twisted out of its plane to lie against the outer surface of said pockets, the distance between the rings being adjusted by increasing the degree of twist to the ends of the connecting members.

In testimony that I claim the foregoing as my invention, I have signed my name in presence of two subscribing witnesses.

JAKOB SCHMID-ROOST.

Witnesses:
ERNST FISCHER,
CARL GUBLER.